United States Patent [19]

Imaizumi

[11] Patent Number: 4,693,566

[45] Date of Patent: Sep. 15, 1987

[54] ZOOM LENS SYSTEM

[75] Inventor: Masaki Imaizumi, Tokyo, Japan

[73] Assignee: Olympus Optical Co., Ltd., Tokyo, Japan

[21] Appl. No.: 645,394

[22] Filed: Aug. 29, 1984

[30] Foreign Application Priority Data

Sep. 8, 1983 [JP] Japan .................. 58-164197

[51] Int. Cl.⁴ .............................. G02B 15/14
[52] U.S. Cl. .................... 350/427; 350/423
[58] Field of Search ................. 350/423, 427

[56] References Cited

U.S. PATENT DOCUMENTS 3,615,125  10/1971  Higuchi et al. ............ 350/427
4,232,942  11/1980  Ikemori ..................... 350/423

FOREIGN PATENT DOCUMENTS 55-40849  10/1980  Japan .

Primary Examiner—John K. Corbin
Assistant Examiner—Paul M. Dzierzynski
Attorney, Agent, or Firm—Cushman, Darby & Cushman

[57] ABSTRACT

A zoom lens system comprising a vari-focal system and a relay lens system wherein the vari-focal system comprises a first lens group having positive refractive power and comprising a cemented doublet, a second lens group having negative refractive power and comprising a cemented doublet, and a third lens group having positive refractive power, and the relay lens system comprises a front lens group having positive refractive power, and a rear lens group having positive refractive power, the aperture ratio thereof being large and aberrations thereof being corrected favorably.

5 Claims, 7 Drawing Figures

ZOOM LENS SYSTEM

BACKGROUND OF THE INVENTION (a) Field of the Invention

The present invention relates to a zoom lens system and, more particularly, to a zoom lens system with a focal length variable from 75 mm to 150 mm and large aperture ratio about F/2.8.

(b) Description of the Prior Art

There are many known zoom lens systems for photographing with focal lengths variable from about 75 mm to about 150 mm. However, most of them have aperture ratios about F/4 to F/3.5. This means that the F number when the stop is fully open is large, brightness of the lens system is low and, consequently, photographing conditions are limited. Moreover, as the brightness of the lens system is low, it is inconvenient in various points when deciding the composition of the photograph to be taken and focusing the lens system on the object by using the finder. Therefore, at present, users prefer bright photographic lenses with single focal length to zoom lenses.

SUMMARY OF THE INVENTION

It is, therefore, a primary object of the present invention to provide a zoom lens system with a large aperture ratio, i.e., F/2.8, and high performance.

The zoom lens system according to the present invention comprises, in the order from the object side as shown in FIG. 1, a first lens group I having positive refractive power and comprising a cemented doublet, a second lens group II having negative refractive power and comprising a cemented doublet, a third lens group III having positive refractive power, said first, second and third lens groups constituting a vari-focal system, and a relay lens system IV which comprises a front lens group IVa having positive refractive power and a rear lens group IVb having positive refractive power, said zoom lens system according to the present invention fulfilling the conditions (1) and (2) shown below:

$$\frac{n_I' - n_I}{r_I} f_I < -0.05 \quad (1)$$

where, reference symbol $f_I$ represents the focal length of the first lens group I, reference symbol $f_{II}$ represents the focal length of the second lens group II, reference symbols $n_I$ and $n_I'$ respectively represent refractive indices of respective lens elements constituting the cemented doublet in the first lens group I, reference symbol $r_I$ represents the radius of curvature of the cemented surface in the first lens group I.

When making the aperture ratio of a lens system large, it is difficult to correct spherical aberration especially. In case of the zoom lens system according to the present invention, spherical aberration is corrected favourably by adopting the above-mentioned lens composition and, at the same time, arranging to fulfill the conditions (1) and (2).

In case of a zoom lens system, the lens composition varies at the time of focusing and zooming unlike photographic lens systems in general. Therefore, it is difficult to correct aberrations of the lens system as a whole in well balanced state unless aberrations of each lens group are corrected favourably to some degree.

For example, the first lens group I is to be moved for the purpose of focusing. Aberrations to be caused by said lens group can be made small when the power of said lens group is made weak. However, when the power is made too weak, the focusing action becomes weak and this is not desirable. Therefore, the first lens group I should have a certain degree of power. In the present invention, by taking the fact that the first lens group I has positive refractive power into consideration, a cemented surface having negative refractive power is provided in said lens group and said negative refractive power is defined as shown by the condition (1) so that spherical aberration to be caused by the first lens group I is thereby prevented from occurring. As the height of paraxial marginal ray is the highest in the first lens group I, it is important to favourably correct spherical aberration to be caused by said lens group.

If the value defined by the condition (1) becomes larger than the upper limit thereof, negative refractive action of the above-mentioned cemented surface becomes weak and, consequently, spherical aberration will be undercorrected.

The second lens group II serves as a variator at the time of zooming. To arrange the vari-focal system compactly by arranging that the amount of movement of said lens group at the time of zooming does not become large, it is unavoidable to make the power of the second lens group II comparatively strong. Therefore, by taking the fact that the second lens group II has negative refractive power into consideration, a cemented surface having positive refractive action is provided in said lens group, and positive refractive action of said cemented surface is defined so that spherical aberration to be caused by the second lens group II is thereby corrected favourably.

By adopting the lens composition explained so far, it is possible to obtain a zoom lens system with a large aperture ratio and well corrected aberrations which is an object of the present invention. However, when it is arranged that the rear lens group IVb in the relay lens system IV comprises a plural number of lenses including at least one positive lens and respective lens groups fulfill the conditions (3) through (5) shown below, it is possible to favourably correct negative distortion which is liable to become conspicuous when a photograph is taken.

$$1.0 < \frac{f_{IVb}}{f_I} < 2.0 \quad (3)$$

$$1.75 < \frac{f_{IVb3}}{f_{IV}} < 2.00 \quad (4)$$

$$0.2 < \frac{D}{f_{IV}} < 0.3 \quad (5)$$

In respective conditions shown in the above, reference symbol $f_{IV}$ represents the focal length of the relay lens system IV, reference symbol $f_{IVb}$ represents the focal length of the rear lens group IVb in the relay lens system IV, reference symbol $f_{IVb3}$ represents the focal length of the positive lens arranged on the image side in the rear lens group IVb in the relay lens system IV, and reference symbol D represents the airspace between the front lens group IVa and rear lens group IVb in the relay lens system IV.

The condition (3) relates to balance of refractive powers between the first lens group I and rear lens group IVb in the relay lens system IV.

As offaxial rays are subjected to strong positive refractive action by the first lens group I, there is such tendency that principal rays are directed toward the plus side. Besides, lower rays which cause coma also have such tendency that they are directed toward the plus side. Therefore, when the rear lens group IVb is arranged to have positive refractive action by selecting the focal length $f_{IVb}$ of the rear lens group IVb in the relay lens system IV within the range defined by the condition (3), it is possible to arrange that distortion, which curves toward the puls side, is shifted toward the minus side. Besides, it is possible to direct the lower rays also toward the minus side and, therefore, it is possible to correct coma.

If the value of $f_{IVb}/f_I$ becomes smaller than the lower limit of the condition (3), it is impossible to effectively offset distortion, which is caused by the first lens group I, by means of the rear lens group IVb in the relay lens system IV and, consequently, positive distortion remains. If the value of $f_{IVb}/f_I$ becomes larger than the upper limit of the condition (3), it is impossible to obtain a sufficient back focal length which is needed for a lens system for a single-lens reflex camera.

The condition (4) is established in order to correct distortion more favourably in addition to the fact that the condition (3) is established.

In the relay lens system IV, the heights of offaxial rays become the highest at the positive lens arranged on the image side in the rear lens group IVb in the relay lens system IV. Therefore, the action to shift distortion toward the mines side becomes strong when the focal length of said positive lens is made short and becomes weak when the focal length of said positive lens is made long. On the other hand, at said positive lens, the height of paraxial ray is low. Therefore, by said positive lens, it is possible to control offaxial rays without largely varying the paraxial ray.

If the focal length of said positive lens becomes large and $f_{IVb3}/f_{IV}$ exceeds the upper limit of the condition (4), the correcting action of said positive lens for distortion becomes insufficient, and distortion curves toward the plus side in all zoomed states from the teleposition to the wide position. When the focal length of said positive lens becomes short and $f_{IVb3}/f_{IV}$ becomes smaller than the lower limit of the condition (4), distortion in the wide position largely curves toward the minus side though distortion in the teleposition becomes favourable.

The condition (5) is established in order to arrange the relay lens system compactly in spite of the fact that the relay lens system comprises the positive front lens group IVa and positive rear lens group IVb and, at the same time, to correct aberrations satisfactorily favourably.

When the airspace D between the front lens group IVa and rear lens group IVb becomes smaller than the lower limit of the condition (5), it is effective for making the relay lens system compact. However, the heights of offaxial rays become low and, consequently, the effect to be obtained by giving positive power to the rear lens group IVb in the relay lens system IV becomes small. When the value of D becomes larger than the upper limit of the condition (5), the heights of offaxial rays become high and, therefore, it is possible to correct offaxial aberrations satisfactorily. However, it is impossible to make the lens system compact. Moreover, as the back focal length becomes short, it is impossible to obtain a lens system suitable for a single-lens reflex camera.

For respective lens groups constituting the zoom lems system according to the present invention, it is preferable to adopt the lens configuration as shown in FIG. 1. That is, it is preferable to arrange that the first lens group I comprises a positive single-lens and a positive cemented doublet consisting of a positive and negative lens elements, the second lens group II comprises a negative single lens and a negative cemented doublet consisting of a negative and positive lens elements, the third lens group III comprises a positive cemented doublet consisting of a positive and negative lens elements, the front lens group IVa in the relay lens system IV comprises a positive single lens and a negative cemented doublet consisting of a positive and negative lens elements, and the rear lens group IVb in the relay lens system IV comprises a positive single lens, a negative single lens and a positive single lens.

By arranging that the first lens group I comprises a positive single lens and a cemented doublet consisting of a positive and negative lens elements, it is so arranged that spherical aberration, longitudinal chromatic aberration, distortion, astigmatism, etc. are corrected favourably.

In the first lens group I, the heights of paraxial rays is the highest. Therefore, if spherical aberration, longitudinal chromatic aberration, etc. are caused by the first lens group, it is difficult to offset them by the lenses constituting the second lens group II and on. Besides, the heights of offaxial principal rays are also high in the first lens group I. Therefore, if distortion, astigmatism, longitudinal chromatic aberration, etc. are caused by the first lens group, it is difficult to offset them by the lenses constituting the second lens group II and on.

By the fact that the first lens group I is composed as described in the above, it is possible to give sufficient refractive power as the first converging lens group to the first lens group I and, at the same time, to make aberrations to be caused by said lens group small. That is, by providing the positive single lens, sufficient converging action required at the first lens group is given to said positive single-lens and, at the same time, by providing the cemented doublet consisting of the positive and negative lens elements, diverging action is given to the cemented surface thereof so as to offset aberrations caused by said positive single lens. Undercorrected spherical aberration caused by the positive single-lens is corrected by the cemented surface of the cemented doublet consisting of the positive and negative lens elements. Besides, longitudinal chromatic aberration is also reduced by the correcting action of said cemented doublet to the degree that it can be satisfactorily corrected by the second lens group II. As for the offaxial principal rays, strong positive distortion caused by the positive single lens can be corrected by said cemented surface and astigmatism can be also corrected in the same way.

Now, as the second lens group II is to be largely moved at the time of zooming, aberrations of said lens group itself should be corrected satisfactorily. Besides, it should be arranged that a sufficient zoom ratio is obtained without moving said lens group so largely. Therefore, the negative single lens is provided in order to give sufficient action as a negative lens group to the second lens group II. Besides, by providing the negative cemented doublet, variation in chromatic aberration to be caused at the time of zooming is reduced and, by means of converging action of the cemented surface, spherical aberration is prevented from largely curving toward the overcorrection side.

The third lens group III is arranged as a cemented doublet consisting of a positive and negative lens elements due to the following reason.

The third lens group III is to be moved at the time of zooming by forming a curve concave toward the image side in order to prevent variation in the image position caused when the second lens group II is moved for the purpose of zooming. The third lens group should be arranged as a cemented doublet in order to reduce variation in chromatic aberration and variation in spherical aberration to be caused by zooming.

It is due to the reason described below that the relay lens system IV is composed of the front lens group IVa having positive refractive power and rear lens group IVb having positive refractive power and it is so arranged that the front lens group IVa comprises a positive single lens and a negative cemented doublet consisting of a positive and negative lens elements and the rear lens group IVb comprises a positive single lens, a negative single lens and a positive single lens.

The relay lens system IV is arranged so that it does not move even at the time of zooming and aberrations are corrected in well balanced state at all focal lengths.

The relay lens system IV is composed of the positive front lens group IVa and positive rear lens group IVb because it is then possible to give sufficient power to the relay lens system IV though it is disadvantageous for making the lens system compact. Especially when the rear lens group IVb is arranged to have positive power, it is possible to correct offaxial aberrations caused by the first lens group I. That is, distortion caused by the first lens group I which curves toward the plus side can be shifted toward the minus side by means of the rear lens group IVb and, therefore, it is possible to reduce positive distortion which is comparatively liable to become conspicuous.

For the zoom lens system according to the present invention, it is possible to correct aberrations more favourably when it is arranged to fulfill the conditions (6) through (9) shown below at the same time as adopting the lens configuration described so far.

$$1.6 < \frac{n_1 + n_2}{2} \quad (6)$$

$$40 < |v_5 - v_6| \quad (7)$$

$$1.6 < \frac{n_9 + n_{10}}{2} \quad (8)$$

$$\frac{n_{11} - n_{10}}{r_{17}} \cdot f_{IV} < -0.3 \quad (9)$$

In respective conditions shown in the above, reference symbols $n_1$ represents the refractive index of the positive single lens in the first lens group I, reference symbol $n_2$ represents the refractive index of the positive lens elements constituting the cemented doublet in the first lens group I, reference symbol $n_9$ represents the refractive index of the positive lens arranged on the object side in the front lens group IVa in the relay lens system IV, reference symbols $n_{10}$ and $n_{11}$ respectively represent refractive indices of respective lens elements constituting the cemented doublet in the front lens group IVa in the relay lens system IV, reference symbols $v_5$ and $v_6$ respectively represent Abbe's numbers of respective lens elements constituting the cemented doublet in the second lens group II, and reference symbol $r_{17}$ represents the radius of curvature of the cemented surface of the cemented doublet in the front lens group IVa in the relay lens system IV.

The condition (6) is established in order to make refractive indices $n_1$ and $n_2$ of positive lenses in the front lens group I large so as to thereby make radii of curvature of surfaces having positive refractive power large and to reduce negative spherical aberration to be caused. If the value defined by the condition (6) is made smaller than the lower limit thereof, spherical aberration to be caused becomes large, and this is not desirable.

The condition (7) is established in order to prevent variation in chromatic aberration to be caused by zooming, and it serves to minimize chromatic aberration to be caused by the second lens group II, which is moved largely at the time of zooming. If the value defined by the condition (7) is made smaller than the lower limit thereof, variation in chromatic aberration becomes large.

The condition (8) is established so that refractive indices of positive lenses in the front lens group IVa in the relay lens system IV having positive refractive power is made large in order to thereby make radii of curvature of surfaces of said positive lenses large and to reduce negative spherical aberration to be caused. If the value defined by the condition (8) is made smaller than the lower limit thereof, spherical aberration will be undercorrected.

The condition (9) relates to the front lens group IVa in the relay lens system IV. That is, a cemented doublet is provided in said lens group, and the condition (9) is established in order to give negative refractive power to the cemented surface thereof and to thereby correct spherical aberration, which is liable to be undercorrected. If the value defined by the condition (9) becomes larger than the upper limit thereof, spherical aberration will be undercorrected.

DETAILED DESCRIPTION OF THE PREFERRED EMBODIMENTS

Figure 1:
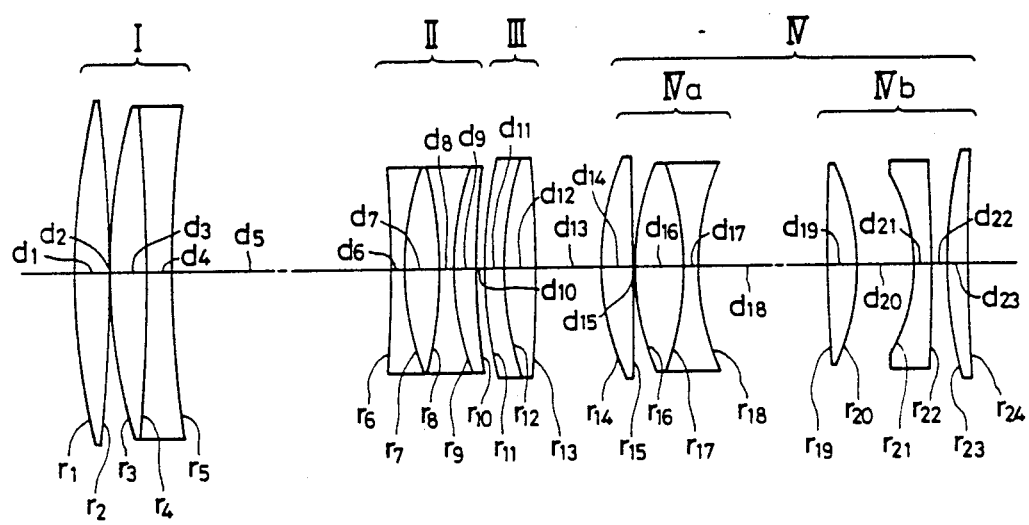
FIG. 1 shows a sectional view of the zoom lens system according to the present invention in the teleposition.

Now, preferred embodiments of the zoom lens system according to the present invention described so far are shown below.

| Embodiment 1 | | |
|---|---|---|
| f = 144.75~76.85  F/2.9 | | |
| $r_1 = 125.481$ | | |
| $d_1 = 5.67$ | $n_1 = 1.62041$ | $v_1 = 60.27$ |
| $r_2 = -356.821$ | | |
| $d_2 = 0.35$ | | |
| $r_3 = 108.681$ | | |
| $d_3 = 6.08$ | $n_2 = 1.62041$ | $v_2 = 60.27$ |

-continued

| | | |
|---|---|---|
| $r_4 = -291.731$ | | |
| $d_4 = 3.78$ | $n_3 = 1.75520$ | $\nu_3 = 27.51$ |
| $r_5 = 179.863$ | | |
| $d_5 = D_1$ | | |
| $r_6 = -155.584$ | | |
| $d_6 = 2.1$ | $n_4 = 1.50378$ | $\nu_4 = 66.81$ |
| $r_7 = 48.282$ | | |
| $d_7 = 5.77$ | | |
| $r_8 = -62.366$ | | |
| $d_8 = 2.1$ | $n_5 = 1.48749$ | $\nu_5 = 70.15$ |
| $r_9 = 47.373$ | | |
| $d_9 = 3.78$ | $n_6 = 1.80518$ | $\nu_6 = 25.43$ |
| $r_{10} = 119.176$ | | |
| $d_{10} = D_2$ | | |
| $r_{11} = 89.052$ | | |
| $d_{11} = 2.89$ | $n_7 = 1.84666$ | $\nu_7 = 23.88$ |
| $r_{12} = 56.498$ | | |
| $d_{12} = 5.27$ | $n_8 = 1.5713$ | $\nu_8 = 52.92$ |
| $r_{13} = -217.669$ | | |
| $d_{13} = D$ | | |
| $r_{14} = 47.702$ | | |
| $d_{14} = 5.15$ | $n_9 = 1.617$ | $\nu_9 = 62.79$ |
| $r_{15} = -1657.732$ | | |
| $d_{15} = 0.55$ | | |
| $r_{16} = 49.122$ | | |
| $d_{16} = 8.03$ | $n_{10} = 1.617$ | $\nu_{10} = 62.79$ |
| $r_{17} = -43.869$ | | |
| $d_{17} = 2.08$ | $n_{11} = 1.79952$ | $\nu_{11} = 42.24$ |
| $r_{18} = 44.133$ | | |
| $d_{18} = 20.47$ | | |
| $r_{19} = 277.752$ | | |
| $d_{19} = 4.87$ | $n_{12} = 1.6393$ | $\nu_{12} = 44.88$ |
| $r_{20} = -40.774$ | | |
| $d_{20} = 9.41$ | | |
| $r_{21} = -29.245$ | | |
| $d_{21} = 2.37$ | $n_{13} = 1.6393$ | $\nu_{13} = 44.88$ |
| $r_{22} = -536.761$ | | |
| $d_{22} = 2.98$ | | |
| $r_{23} = 85.973$ | | |
| $d_{23} = 3.19$ | $n_{14} = 1.6968$ | $\nu_{14} = 56.49$ |
| $r_{24} = 316.952$ | | |
| f    144.75    105.454    76.852 | | |
| $D_1$    35.274    23.785    8.458 | | |
| $D_2$    1.543    19.93    32.757 | | |
| $D_3$    11.035    4.137    6.637 | | |

$$\frac{n_I' - n_I}{r_I} f_I = -0.058,$$

$f_I = 124.981 \quad f_{IVb} = 175.063$
$f_{IV} = 85.109 \quad f_{IVb3} = 168.351 \quad D = 20.47$

Embodiment 2
f = 145.5~77.25  F/2.9

| | | |
|---|---|---|
| $r_1 = 139.767$ | | |
| $d_1 = 6.94$ | $n_1 = 1.62041$ | $\nu_1 = 60.27$ |
| $r_2 = -324.099$ | | |
| $d_2 = 0.52$ | | |
| $r_3 = 108.578$ | | |
| $d_3 = 7.18$ | $n_2 = 1.62041$ | $\nu_2 = 60.27$ |
| $r_4 = -280.169$ | | |
| $d_4 = 3.47$ | $n_3 = 1.7552$ | $\nu_3 = 27.51$ |
| $r_5 = 200.413$ | | |
| $d_5 = D_1$ | | |
| $r_6 = -229.387$ | | |
| $d_6 = 2.25$ | $n_4 = 1.50378$ | $\nu_4 = 66.81$ |
| $r_7 = 48.789$ | | |
| $d_7 = 5.95$ | | |
| $r_8 = -57.655$ | | |
| $d_8 = -2.08$ | $n_5 = 1.48749$ | $\nu_5 = 70.15$ |
| $r_9 = 46.932$ | | |
| $d_9 = 4.00$ | $n_6 = 1.80518$ | $\nu_6 = 25.43$ |
| $r_{10} = 106.979$ | | |
| $d_{10} = D_2$ | | |
| $r_{11} = 81.978$ | | |
| $d_{11} = 2.58$ | $n_7 = 1.84666$ | $\nu_7 = 23.88$ |
| $r_{12} = 53.598$ | | |
| $d_{12} = 6.25$ | $n_8 = 1.57135$ | $\nu_8 = 52.92$ |
| $r_{13} = -261.852$ | | |
| $d_{13} = D_3$ | | |
| $r_{14} = 49.787$ | | |
| $d_{14} = 5.06$ | $n_9 = 1.617$ | $\nu_9 = 62.79$ |
| $r_{15} = -2303.221$ | | |
| $d_{15} = 0.5$ | | |
| $r_{16} = 49.021$ | | |
| $d_{16} = 8.09$ | $n_{10} = 1.617$ | $\nu_{10} = 62.79$ |
| $r_{17} = -41.014$ | | |
| $d_{17} = 2.12$ | $n_{11} = 1.79952$ | $\nu_{11} = 42.24$ |
| $r_{18} = 44.219$ | | |
| $d_{18} = 20.68$ | | |
| $r_{19} = 230.521$ | | |
| $d_{19} = 5.03$ | $n_{12} = 1.66892$ | $\nu_{12} = 44.98$ |
| $r_{20} = -41.385$ | | |
| $d_{20} = 10.14$ | | |
| $r_{21} = -30.13$ | | |
| $d_{21} = 2.37$ | $n_{13} = 1.66892$ | $\nu_{13} = 44.98$ |
| $r_{22} = -811.531$ | | |
| $d_{22} = 1.27$ | | |
| $r_{23} = 89.995$ | | |
| $d_{23} = 3.97$ | $n_{14} = 1.6968$ | $\nu_{14} = 55.52$ |
| $r_{24} = 444.145$ | | |
| f    145.5    106.00    77.25 | | |
| $D_1$    32.69    20.946    5.343 | | |
| $D_2$    1.593    19.056    31.173 | | |
| $D_3$    11.503    5.784    9.271 | | |

$$\frac{n_I' - n_I}{r_I} f_I = -0.06,$$

$f_I = 124.096 \quad f_{IVb} = 147.611$
$f_{IV} = 85.071 \quad f_{IVb3} = 161.235 \quad D = 20.68$ In embodiments shown in the above, reference symbols $r_1$ through $r_{24}$ respectively represent radii of curvature of respective lens surfaces, reference symbols $d_1$ through $d_{23}$ respectively represent thicknesses of respective lenses and airspaces between respective lenses, reference symbols $n_1$ through $n_{14}$ respectively represent refractive indices of respective lenses, reference symbols $\nu_1$ through $\nu_{14}$ respectively represent Abbe's numbers of respective lenses, and reference symbol f represents the focal length of the lens system as a whole.

Figure 2:
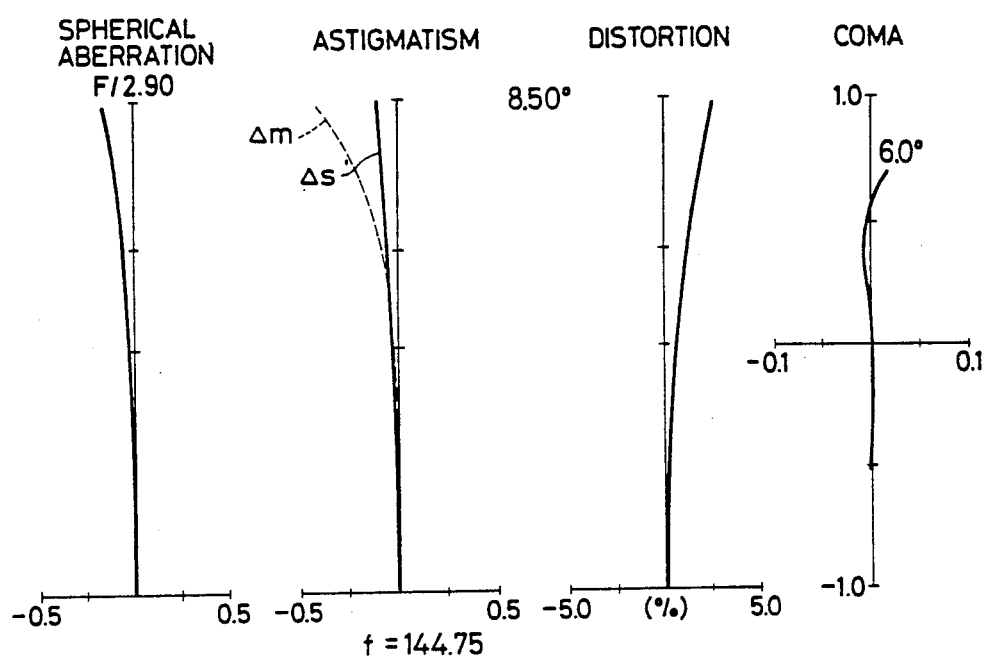
FIGS. 2 through 4 respectively show graphs illustrating aberration curves of Embodiment 1 of the present invention in the teleposition, standard position and wide position.
Figure 3:
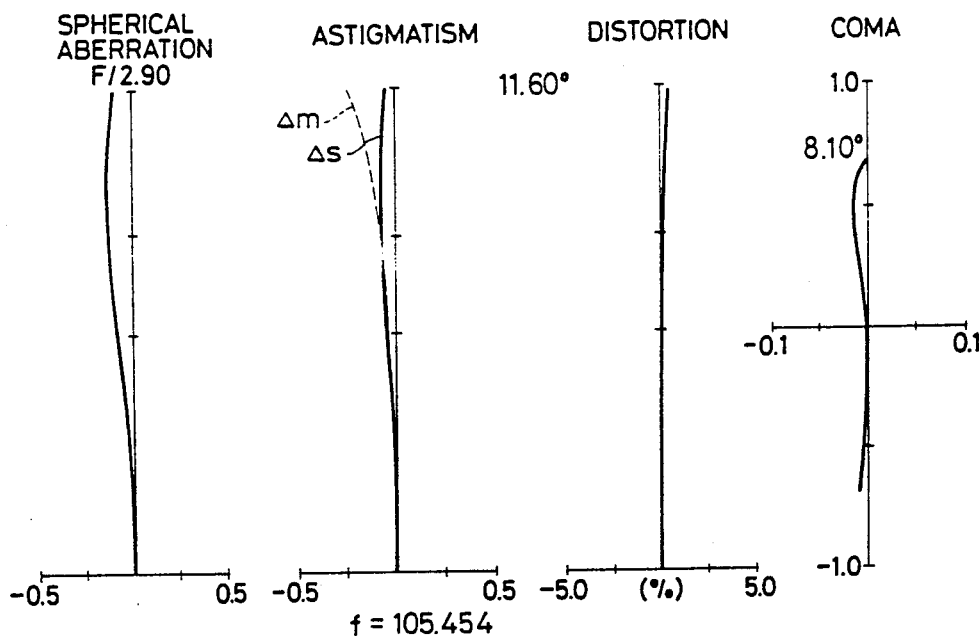
Figure 4:
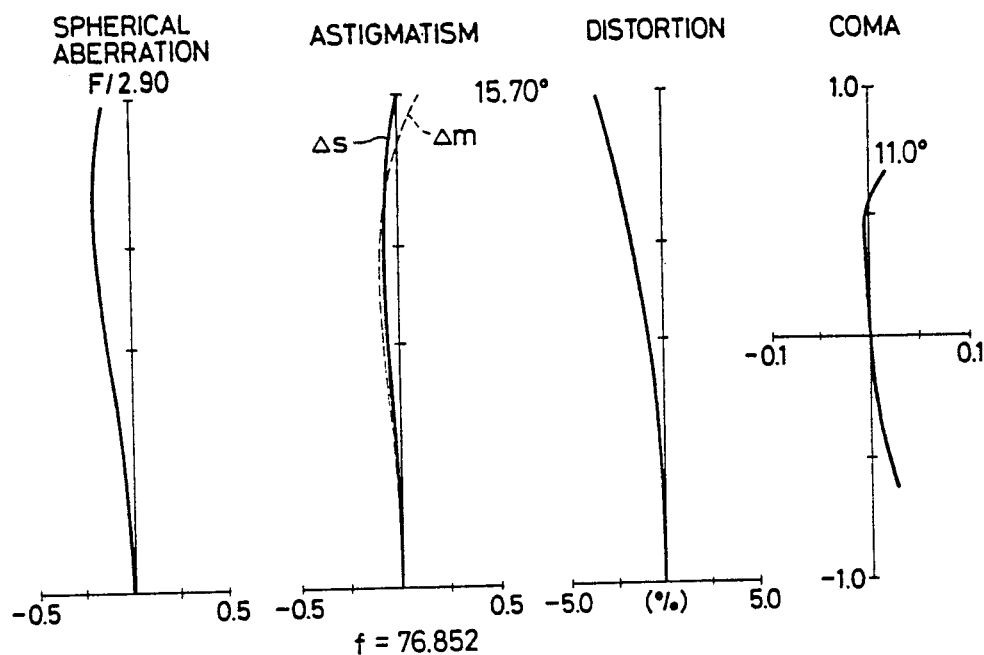
Figure 5:
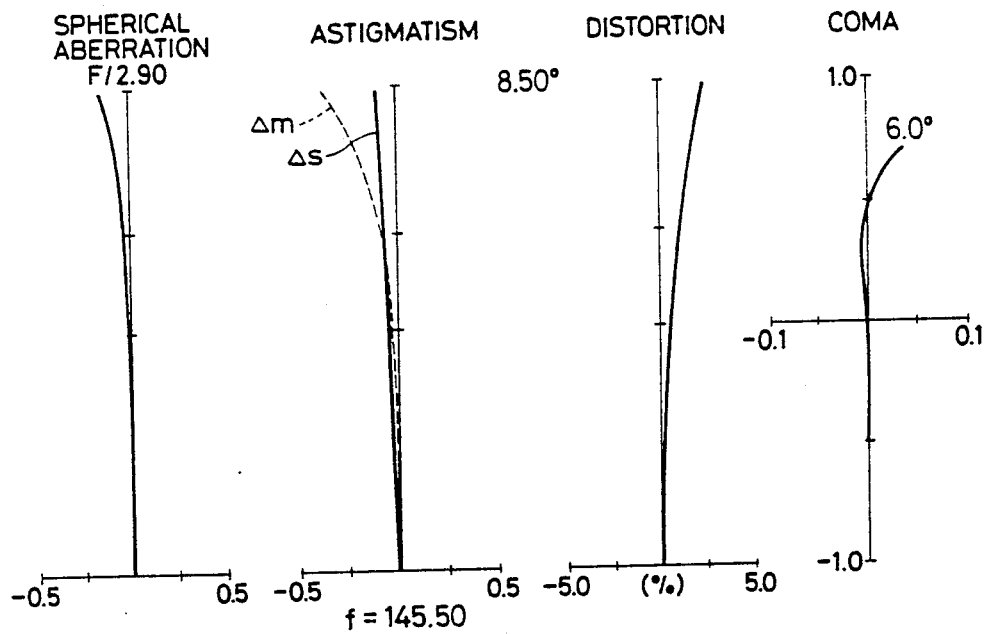
FIGS. 5 through 7 respectively show graphs illustrating aberration curves of Embodiment 2 of the present invention in the teleposition, standard position and wide position.
Figure 6:
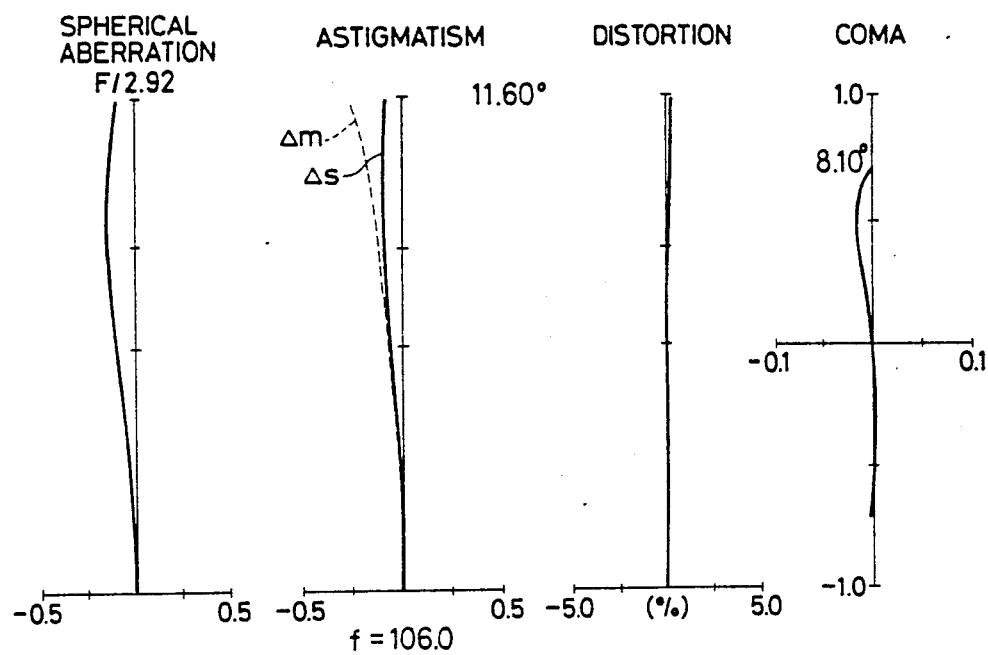
Figure 7:
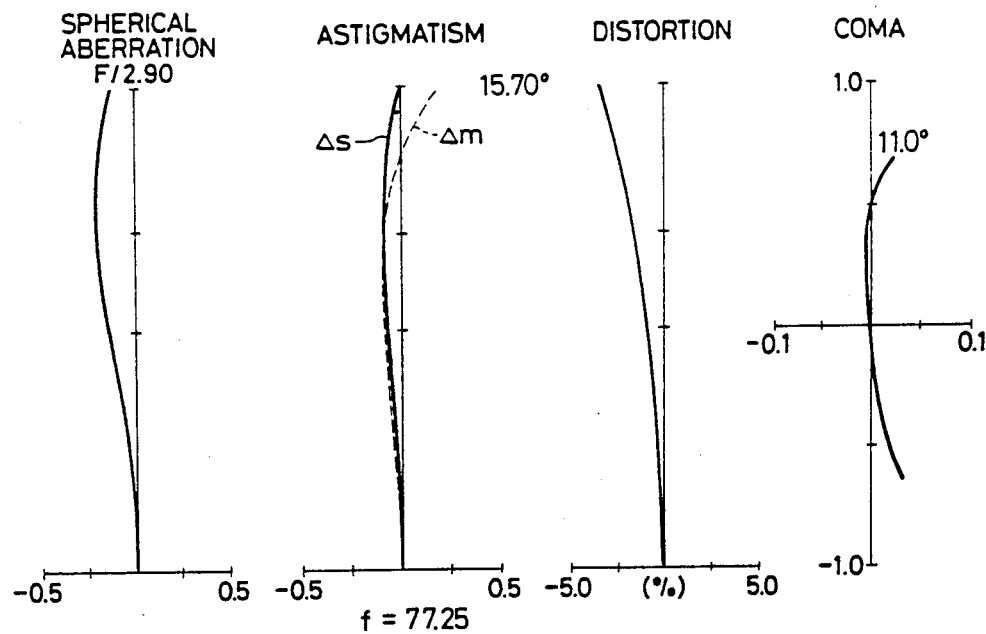

As it is evident from respective embodiments shown in the above and from graphs of aberration curves shown in FIGS. 2 through 7, the zoom lens system according to the present invention has a large aperture ratio, i.e., F/2.9, and spherical aberration, distortion and other aberrations thereof are corrected favourably.

I claim:

1. A zoom lens system comprising a vari-focal system and a relay lens system, comprising a first lens group having positive refractive power and comprising a cemented doublet, a second lens group having negative refractive power and comprising a cemented doublet, and a third lens group having positive refractive power, and said relay lens system comprising a front lens group having positive refractive power, and a rear lens group having positive refractive power comprising a plural number of lenses including at least one positive lens, said zoom lens system fulfilling the conditions (1), (2), (3) are (4) shown below:

$$\frac{n_I' - n_I}{r_I} f_I < -0.05 \quad (1)$$

$$1.0 < \frac{f_{IVb}}{f_I} < 2.0 \quad (2)$$

$$1.75 < \frac{f_{IVb3}}{f_{IV}} < 2.00 \quad (3)$$

-continued $$0.2 < \frac{D}{f_{IV}} < 0.3 \quad (4)$$

where, reference symbol $f_I$ represents the focal length of the first lens group, reference symbol $r_I$ represents the radius of curvature of the cemented surfaces of the cemented doublet in the first lens group, reference symbols $n_I$ and $n_I'$ respectively represent refractive indices of respective lens elements constituting the cemented doublet in the first lens group, reference $f_{IV}$ represents the focal length of the relay lens system, reference symbol $f_{IVb}$ represents the focal length of the rear lens group in the relay lens system, reference symbol $f_{IVb3}$ represents the focal length of the positive lens arranged on the image side in the rear lens group in the relay lens system, and reference symbol D represents the airspace between the front and rear lens groups in the relay lens system.

2. A zoom lens system according to claim 1 wherein said first lens group comprises a positive single lens and a cemented doublet consisting of a positive and negative lens elements, said second lens group comprises a negative single lens and a cemented doublet consisting of a negative and positive lens elements, said third lens group comprises a cemented doublet consisting of a positive and negative lens elements, said front lens group in said relay lens system comprises a positive single lens and a cemented doublet consisting of a positive and negative lens elements, and said rear lens group in said relay lens group comprises a positive single lens, a negative single lens and a positive single lens.

3. A zoom lens system according to claim 2 which fulfills the conditions (6) through (9) shown below:

$$1.6 < \frac{n_1 + n_2}{2} \quad (6)$$

$$40 < |v_5 - v_6| \quad (7)$$

$$1.6 < \frac{n_9 + n_{10}}{2} \quad (8)$$

$$\frac{n_{11} - n_{10}}{r_{17}} f_{IV} < -0.3 \quad (9)$$

where, reference symbol $n_1$ represents the refractive index of the positive single lens in the first lens group, reference symbol $n_2$ represents the refractive index of the positive lens constituting the cemented doublet in the first lens group, reference symbol $n_9$ represents the refractive index of the positive lens arranged on the object side in the front lens group in the relay lens system, reference symbols $n_{10}$ and $n_{11}$ respectively represent refractive indices of respective lens elements constituting the cemented doublet in the front lens group in the relay lens system, reference symbols $v_5$ and $v_6$ respectively represent Abbe's numbers of respective lens elements constituting the cemented doublet in the second lens group, and reference symbol $r_{17}$ represents the radius of curvature of the cemented surface of the cemented doublet in the front lens group in the relay lens system.

4. A zoom lens system according to claim 3 which has the following numerical data:

$$f = 144.75 \sim 76.85 \quad F/2.9$$

-continued

| | | |
|---|---|---|
| $r_1 = 125.481$ | | |
| $d_1 = 5.67$ | $n_1 = 1.62041$ | $v_1 = 60.27$ |
| $r_2 = -356.821$ | | |
| $d_2 = 0.35$ | | |
| $r_3 = 108.681$ | | |
| $d_3 = 6.08$ | $n_2 = 1.62041$ | $v_2 = 60.27$ |
| $r_4 = -291.731$ | | |
| $d_4 = 3.78$ | $n_3 = 1.75520$ | $v_3 = 27.51$ |
| $r_5 = 179.863$ | | |
| $d_5 = D_1$ | | |
| $r_6 = -155.584$ | | |
| $d_6 = 2.1$ | $n_4 = 1.50378$ | $v_4 = 66.81$ |
| $r_7 = 48.282$ | | |
| $d_7 = 5.77$ | | |
| $r_8 = -62.366$ | | |
| $d_8 = 2.1$ | $n_5 = 1.48749$ | $v_5 = 70.15$ |
| $r_9 = 47.373$ | | |
| $d_9 = 3.78$ | $n_6 = 1.80518$ | $v_6 = 25.43$ |
| $r_{10} = 119.176$ | | |
| $d_{10} = D_2$ | | |
| $r_{11} = 89.025$ | | |
| $d_{11} = 2.89$ | $n_7 = 1.84666$ | $v_7 = 23.88$ |
| $r_{12} = 56.498$ | | |
| $d_{12} = 5.27$ | $n_8 = 1.57135$ | $v_8 = 52.92$ |
| $r_{13} = -217.669$ | | |
| $d_{13} = D_3$ | | |
| $r_{14} = 47.702$ | | |
| $d_{14} = 5.15$ | $n_9 = 1.617$ | $v_9 = 62.79$ |
| $r_{15} = -1657.732$ | | |
| $d_{15} = 0.55$ | | |
| $r_{16} = 49.122$ | | |
| $d_{16} = 8.03$ | $n_{10} = 1.617$ | $v_{10} = 62.79$ |
| $r_{17} = -43.869$ | | |
| $d_{17} = 2.08$ | $n_{11} = 1.79952$ | $v_{11} = 42.24$ |
| $r_{18} = 44.133$ | | |
| $d_{18} = 20.47$ | | |
| $r_{19} = 277.752$ | | |
| $d_{19} = 4.87$ | $n_{12} = 1.6393$ | $v_{12} = 44.88$ |
| $r_{20} = -40.774$ | | |
| $d_{20} = 9.41$ | | |
| $r_{21} = -29.245$ | | |
| $d_{21} = 2.37$ | $n_{13} = 1.6393$ | $v_{13} = 44.88$ |
| $r_{22} = -536.761$ | | |
| $d_{22} = 2.98$ | | |
| $r_{23} = 85.973$ | | |
| $d_{23} = 3.19$ | $n_{14} = 1.6968$ | $v_{14} = 56.49$ |
| $r_{24} = 316.952$ | | |

| f | 144.75 | 105.454 | 76.852 |
|---|---|---|---|
| $D_1$ | 35.274 | 23.785 | 8.458 |
| $D_2$ | 1.543 | 19.93 | 32.757 |
| $D_3$ | 11.035 | 4.137 | 6.637 |

$$\frac{n_I' - n_I}{r_I} f_I = -0.058,$$

$f_I = 124.981$  $f_{IVb} = 175.063$
$f_{IV} = 85.109$  $f_{IVb3} = 168.35$  $D = 20.47$ where, reference symbols $r_1$ through $r_{24}$ respectively represent radii of curvature of respective lens surfaces, reference symbols $d_1$ through $d_{23}$ respectively represent thicknesses of respective lenses and airspaces between respective lenses, reference symbols $n_1$ through $n_{14}$ respectively represent refractive indices of respective lenses, reference symbols $v_1$ through $v_{14}$ respectively represent Abbe's numbers of respective lenses, and reference symbol f represents the focal length of the lens system as a whole.

5. A zoom lens system according to claim 3 which has the following numerical data:

$$f = 145.5 \sim 77.25 \quad F/2.9$$

| | | |
|---|---|---|
| $r_1 = 139.767$ | | |
| $d_1 = 6.94$ | $n_1 = 1.62041$ | $v_1 = 60.27$ |
| $r_2 = -324.099$ | | |
| $d_2 = 0.52$ | | |

-continued f = 145.5~77.25  F/2.9

| | | | |
|---|---|---|---|
| $r_3 = 108.578$ | | | |
| | $d_3 = 7.18$ | $n_2 = 1.62041$ | $\nu_2 = 60.27$ |
| $r_4 = -280.169$ | | | |
| | $d_4 = 3.47$ | $n_3 = 1.7552$ | $\nu_3 = 27.51$ |
| $r_5 = 200.413$ | | | |
| | $d_5 = D_1$ | | |
| $r_6 = -229.387$ | | | |
| | $d_6 = 2.25$ | $n_4 = 1.50378$ | $\nu_4 = 66.81$ |
| $r_7 = 48.789$ | | | |
| | $d_7 = 5.95$ | | |
| $r_8 = -57.655$ | | | |
| | $d_8 = 2.08$ | $n_5 = 1.48749$ | $\nu_5 = 70.15$ |
| $r_9 = 46.932$ | | | |
| | $d_9 = 4.00$ | $n_6 = 1.80518$ | $\nu_6 = 25.43$ |
| $r_{10} = 106.979$ | | | |
| | $d_{10} = D_2$ | | |
| $r_{11} = 81.978$ | | | |
| | $d_{11} = 2.58$ | $n_7 = 1.84666$ | $\nu_7 = 23.88$ |
| $r_{12} = 53.598$ | | | |
| | $d_{12} = 6.25$ | $n_8 = 1.57135$ | $\nu_8 = 52.92$ |
| $r_{13} = -261.852$ | | | |
| | $d_{13} = D_3$ | | |
| $r_{14} = 49.787$ | | | |
| | $d_{14} = 5.06$ | $n_9 = 1.617$ | $\nu_9 = 62.79$ |
| $r_{15} = -2303.221$ | | | |
| | $d_{15} = 0.5$ | | |
| $r_{16} = 49.021$ | | | |
| | $d_{16} = 8.09$ | $n_{10} = 1.617$ | $\nu_{10} = 62.79$ |
| $r_{17} = -41.014$ | | | |
| | $d_{17} = 2.12$ | $n_{11} = 1.79952$ | $\nu_{11} = 42.24$ |
| $r_{18} = 44.219$ | | | |
| | $d_{18} = 20.68$ | | |
| $r_{19} = 230.521$ | | | |
| | $d_{19} = 5.03$ | $n_{12} = 1.66892$ | $\nu_{12} = 44.98$ |
| $r_{20} = -41.385$ | | | |
| | $d_{20} = 10.14$ | | |
| $r_{21} = -30.13$ | | | |
| | $d_{21} = 2.37$ | $n_{13} = 1.66892$ | $\nu_{13} = 44.98$ |
| $r_{22} = -811.531$ | | | |
| | $d_{22} = 1.27$ | | |
| $r_{23} = 89.995$ | | | |
| | $d_{23} = 3.97$ | $n_{14} = 1.6968$ | $\nu_{14} = 55.52$ |
| $r_{24} = 444.145$ | | | |

| f | 145.5 | 106.00 | 77.25 |
|---|---|---|---|
| $D_1$ | 32.69 | 20.946 | 5.343 |
| $D_2$ | 1.593 | 19.056 | 31.173 |
| $D_3$ | 11.503 | 5.784 | 9.271 |

$$\frac{n_I' - n_I}{r_I} f_I = -0.06,$$

| | | |
|---|---|---|
| $f_I = 124.096$ | $f_{IVb} = 147.611$ | |
| $f_{IV} = 85.071$ | $f_{IVb3} = 161.235$ | $D = 20.68$ | where, reference symbols $r_1$ through $r_{24}$ respectively represent radii of curvature of respective lens surfaces, reference symbols $d_1$ through $d_{23}$ respectively represent thicknesses of respective lenses and airspaces between respective lenses, reference symbols $n_1$ through $n_{14}$ respectively represent refractive indices of respective lenses, reference symbols $\nu_1$ through $\nu_{14}$ respectively represent Abbe's numbers of respective lenses, and reference symbol f represents the focal length of the lens system as a whole.

* * * * *